July 13, 1937.  E. D. BRADFORD  2,086,762
OIL RECLAIMING DEVICE
Original Filed July 18, 1932   2 Sheets-Sheet 1

INVENTOR.
Elmer D. Bradford
BY
ATTORNEY.

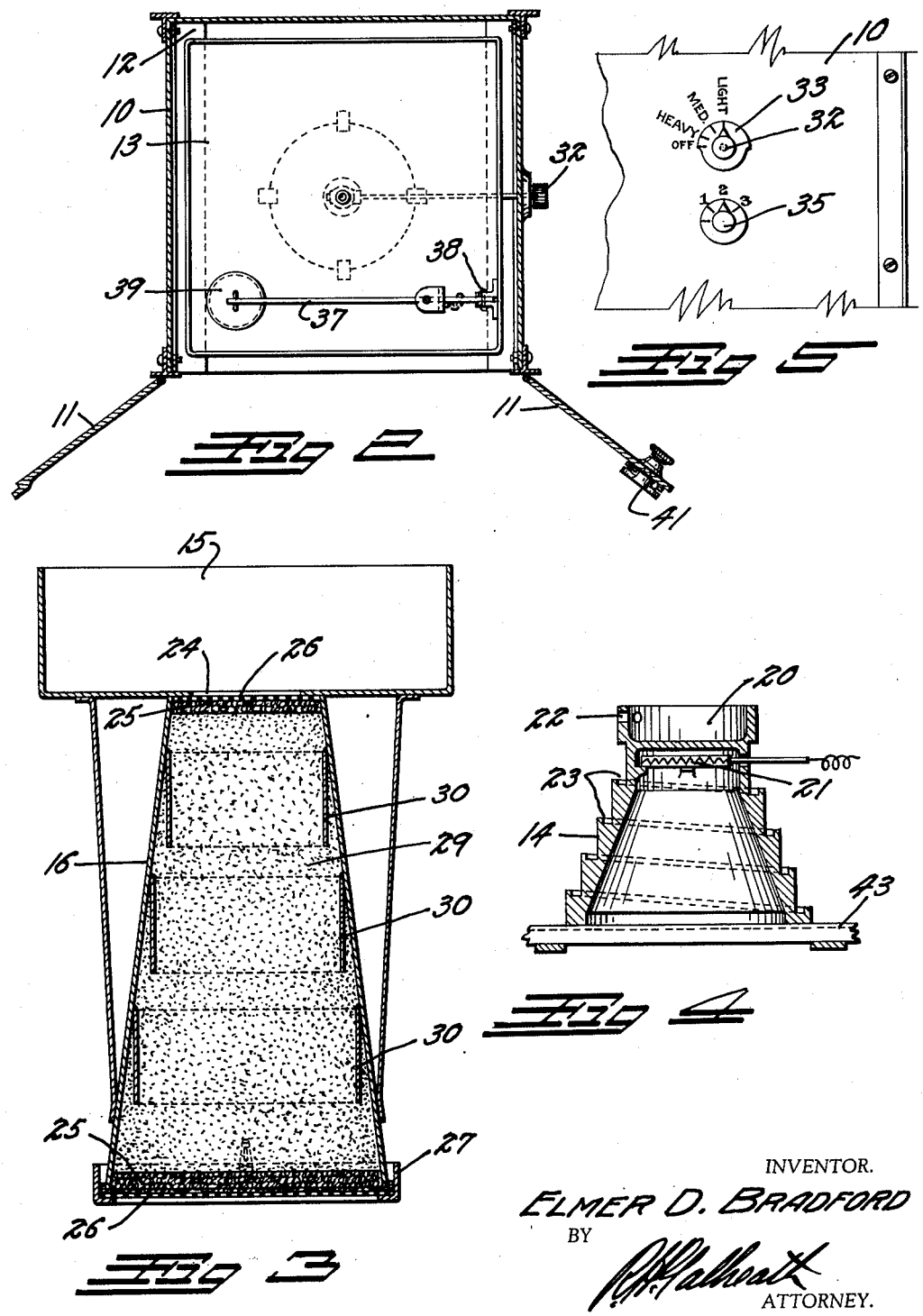

Patented July 13, 1937

2,086,762

UNITED STATES PATENT OFFICE 2,086,762

OIL RECLAIMING DEVICE

Elmer D. Bradford, Denver, Colo., assignor to Kramlich-Bradford Mfg. Co., Denver, Colo., a corporation of Colorado Application July 18, 1932, Serial No. 623,253
Renewed September 11, 1936

8 Claims. (Cl. 210—139)

This invention relates to a device for reclaiming and reconditioning used automotive engine oil, more particularly what is known as "crank case oil."

The principal object of the invention is to provide a neat, compact and highly efficient reclaiming device which will vaporize the water, gasoline, and other volatile dilutents, and which will also completely and entirely remove all suspended solid material such as dirt, carbon metals, etc.

Another object of the invention is to provide a device that can be caused to deliver reclaimed oil of any desired viscosity.

Another object of the invention is to so construct the device that it will be entirely automatic in its operation and will automatically shut off the heating elements when the supply of oil has been exhausted.

Still another object is to provide a novel heating device which will bring all of the oil into intimate contact with the heated surface so as to reduce the consumption of heating current to a minimum.

A further object is to provide a novel and highly efficient filter of the fuller's earth type which will prevent the oil from following the walls and other defined channels through the filtering material, so as to obtain the highest possible efficiency from a minimum amount of filtering material.

A still further object is to so construct the device that it will be entirely enclosed when in operation, so as to prevent the escape of dangerous fumes and yet so that the various operating elements are accessible and easily removable from the enclosure when desired.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 2 is a horizontal section therethrough taken on the line 2—2, Fig. 1.

Fig. 3 is a vertical section through the filtering drum.

Fig. 4 is a similar vertical section through the heating cone.

Fig. 5 is a detail view illustrating the control dials that are positioned on the exterior of the enclosing cabinet.

Figure 1:
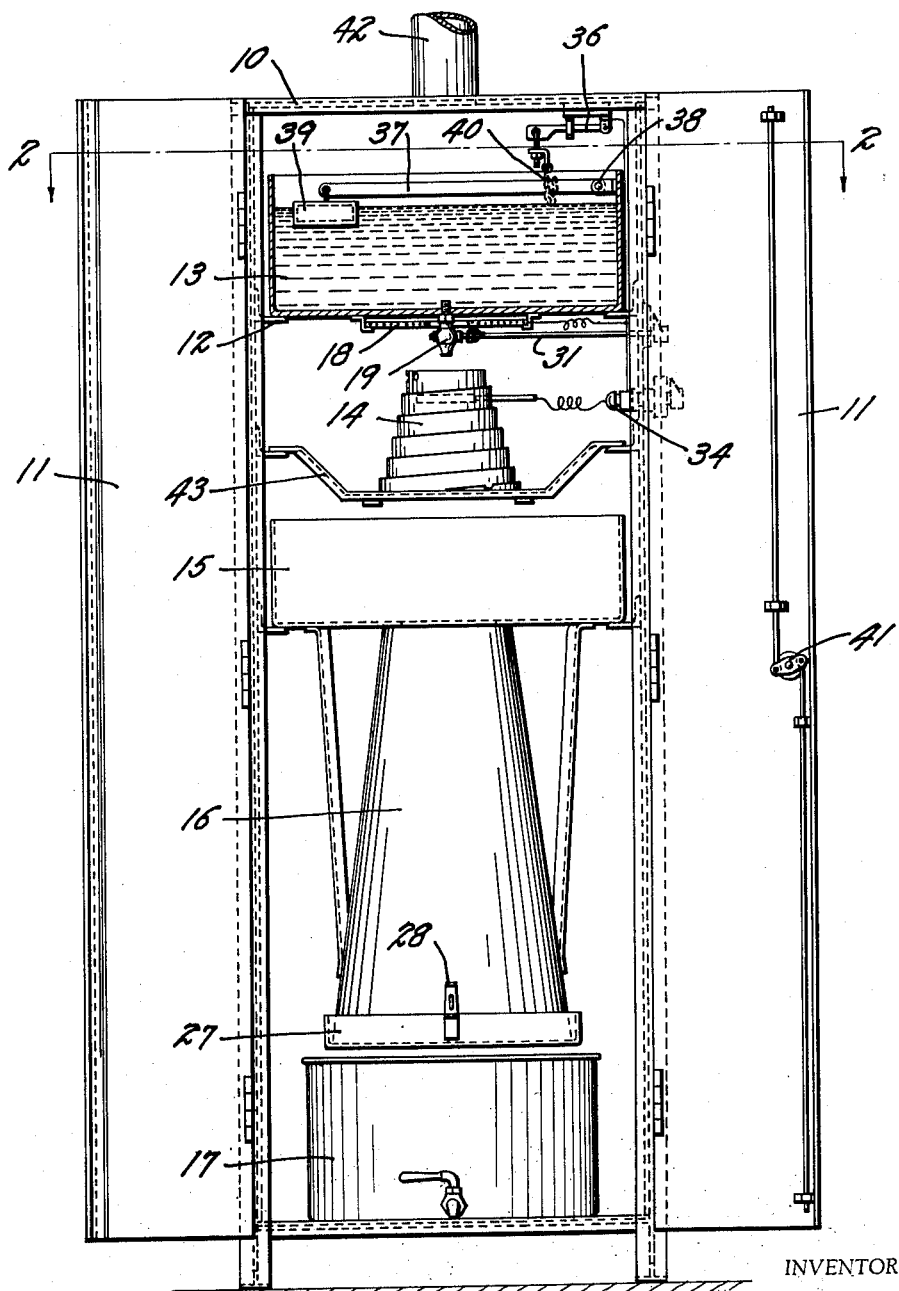
Fig. 1 is a front elevation of the improved oil reclaiming device, illustrating the enclosing doors in the open position.

The entire mechanism is designed to be enclosed in a vertical metal cabinet 10, the front of which may be closed by means of suitable doors 11. The various elements are supported in the cabinet 10 upon angle shelves or slides 12. They comprise a receiving reservoir 13; a heating cone 14; a hot oil pan 15, a filtering drum 16, and a delivery pan 17. All of these elements can be easily slid into or removed from the cabinet 10 on the slides 12.

The oil to be reclaimed is placed in the pan 13 and while in this pan receives a preliminary heating from a suitable heating element 18 which is secured to the bottom of the pan 13. The oil discharges from the pan 13 through a petcock 19.

The oil from the petcock 19 is received in a heating cup 20 formed on the top of the heating cone 14. A second electric heating element 21 is positioned within the heating cone 14 and serves to bring the entire cone to the desired heat. The oil will be increasingly heated in the cup 20 and will flow from the cup either over the edge thereof or through suitable discharge orifices 22 in the sides thereof. This discharging oil flows around the heating cone in a spirally inclined channel 23 which retards its flow and creates a relatively long spiral path which maintains the oil in surface of the intimate contact with the heating cone 14 for a relatively long time.

From the cone 14, the oil drops into the hot oil pan 15 and discharges through a central opening 24 therein into the filtering drum 16. The filtering drum is conical in shape and may contain any desired filtering material 29. It is preferred to employ fuller's earth in the filtering drum, the earth being held between upper and lower layers 25 of cotton, mineral wool, or other suitable porous material. The layers 25 are maintained in place by means of suitable screens 26. The bottom screen 26, is clamped to the filtering drum 16 by means of a suitable flange ring 27 held in place by latches 28. The hot oil from the pan 15 gradually percolates through the filtering material 29 and discharges through the bottom screen 26 into the delivery pan 17.

It is desired to call attention to the novel structure of the filter drum 16. Ordinarily such drums are constructed as vertical cylinders. As a result, the downwardly flowing oil will form channels adjacent the walls of the cylinder through which it will flow without passing through the mass of filtering material. In the present invention, however, this tendency is largely obviated by the conical shape of the drum. Gravity naturally tends to pull the oil straight down. This causes it to be pulled away from the inclined walls of the container and through the mass of filtering material.

This tendency is increased by placing a series of cylindrical baffle plates 30 within the filtering drum and securing these plates to the drum at their upper peripheries. Any desired number of these baffle plates may be used. It will be noted that any oil which may channel along the face of one baffle plate must leave the plate at the bottom and flow through the filtering material. It can not form a continuous channel throughout the depth of the filtering drum.

It is preferred to connect an extension rod 31 to the stem of the petcock 19 to lead to a control knob 32 on the exterior of the cabinet 10. The control knob 32 may be provided with a dial 33 for indicating "light", "medium", and "heavy" oils. For instance, if the knob is turned to the "light" indication, the oil will flow comparatively rapidly over the heating cone 14 so that it will not have sufficient time to evaporate all of the volatile constituents and as a result will produce a lighter or less viscous oil. When turned to the "heavy" indication it will allow but a small flow and a greater heating time. The latter would result in vaporizing practically all of the lighter constituents so as to produce a heavy oil.

This same selective result may be accomplished by connecting the heating element 21 with a three way control switch 34 provided with a suitable control knob 35. By turning the switch to the proper indication, the temperature of the heating column may be controlled to produce the desired fractionations.

It is preferred to connect both the heating elements 18 and 21 through a main switch 36 which is connected with a float arm 37 pivoted to the receiving pan 13 at 38. The free extremity of the float arm 37 is supported, by means of a float 39, on the surface of the oil in the pan 13. When this oil becomes exhausted the float arm 37 will act through a flexible connection 40 to open the main switch 36 and break the circuit to both the heating elements.

In use, the operator fills the pan 13 with crank-case oil and closes the switch 36. He then closes and latches the doors 11 through the medium of any suitable door latch 41. He now turns the heating element knob 35 to the desired heat and the valve knob 32 to the desired flow. He need give the device no further attention. The fumes and vapors will be carried off through a suitable stack 42. When the oil has been completely exhausted from the pan 13 the device will automatically shut itself off.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A filter drum for oil reclaiming devices comprising: a vertically elongated container in the shape of a truncated cone; means for supporting filtering material within said container; said container being open at its top and bottom ends to allow oil to flow downwardly therethrough; and a series of baffle plates within said container, said plates being secured to said container at their tops and extending substantially vertically downward into said filtering material at their bottoms.

2. A filter construction comprising: a container, the walls of which incline inwardly as they approach the top thereof; means for receiving solution adjacent said top; means for supporting filtering material in said container in contact with said walls; and baffle plates contacting along their upper portions with said walls and extending substantially vertically downward and terminating within said filtering material.

3. A filter having a casing gradually widening in a downward direction and a plurality of vertically and horizontally spaced vertically elongated baffle members in said casing having non-converging walls arranged adjacent said casing to prevent flow of liquid down the walls of said casing without impeding flow of liquid in a downward direction in said casing.

4. A filter having a casing widening gradually in a downward direction, said casing having open ends and marginal baffle means extending downwardly from adjacent the wall of said casing in substantially vertically non-converging relation, said casing having filtering material therein and being otherwise free of all obstructions inwardly from said baffle means to and including the central portion of the space within said casing to provide unimpeded flow of liquid downwardly through said casing.

5. A filter having a casing widening in a downward direction, and tubular baffle means in said casing mounted therein to prevent flow of liquid down the walls of said casing, said baffle means depending from said casing and the walls of said baffle means extending in a downwardly non-converging relation from top to bottom of each of said baffle means, providing an unrestricted passage therethrough that does not impede the flow of liquid in a downward direction in said filter.

6. A filter having an upright casing, said casing having an inlet into the upper end thereof having a diameter only slightly less than that of the casing at said end, and longitudinally disposed tubular baffle means depending from said casing so arranged therein as to prevent flow of liquid down the walls of said casing, each of said baffle means having the passages therethrough of at least as great a cross-sectional area throughout the length thereof as is the cross-sectional area of the opening at the inlet end thereof, the passage through each of said baffle means being at least as great in cross sectional area at the lower outlet end thereof as at the upper inlet end thereof.

7. A filter having a casing gradually widening in a downward direction and a plurality of vertically and horizontally spaced vertically elongated baffle members in said casing each having the walls thereof extending in a non-converging relation from top to bottom thereof and arranged adjacent said casing to prevent flow of liquid down the walls of said casing without impeding flow of liquid in a downward direction in said casing, the successive baffle members increasing in cross-sectional area in a downward direction.

8. In a filter, a gradually tapering casing widening downwardly and having top and bottom ends open substantially to the full diameter thereof, a reservoir at the top of said casing having an opening in the bottom thereof leading into said casing substantially equal in area to the opening in the top end of said casing, filtering material filling said casing, means for holding said filtering material in position in said casing, and vertically elongated tubular marginal baffle means in said casing extending to direct the flow in said material downwardly away from the inclined walls of said casing, said baffle means each having a passage of substantially uniform cross-sectional area within the same from end to end thereof.

ELMER D. BRADFORD.